US010627279B2

(12) United States Patent
Hsiao et al.

(10) Patent No.: US 10,627,279 B2
(45) Date of Patent: Apr. 21, 2020

(54) MEASURING DEVICE FOR MEASURING A VOLUME VARIATION OF LIQUID

(71) Applicant: Wistron Corporation, New Taipei (TW)

(72) Inventors: Wen-Hsin Hsiao, New Taipei (TW); Hao-Chen Weng, New Taipei (TW); Shiuan-De Chen, New Taipei (TW); Chien Huang, New Taipei (TW); Wei-Kuo Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 426 days.

(21) Appl. No.: 15/464,312

(22) Filed: Mar. 20, 2017

(65) Prior Publication Data

US 2018/0100752 A1 Apr. 12, 2018

Related U.S. Application Data

(60) Provisional application No. 62/406,421, filed on Oct. 11, 2016.

(30) Foreign Application Priority Data

Dec. 13, 2016 (TW) .............................. 105141223 A

(51) Int. Cl.
*G01F 23/20* (2006.01)
*A47G 23/14* (2006.01)
(Continued)

(52) U.S. Cl.
CPC ............. *G01F 22/02* (2013.01); *A47G 23/14* (2013.01); *G01F 23/20* (2013.01); *A47G 23/16* (2013.01)

(58) Field of Classification Search
CPC .......... G01F 23/20; A47G 23/14; A47G 23/16
See application file for complete search history.

(56) References Cited

U.S. PATENT DOCUMENTS

2014/0340229 A1 11/2014 Wu
2015/0360927 A1 12/2015 Sweeney
(Continued)

FOREIGN PATENT DOCUMENTS

CN 2156773 Y 2/1994
CN 201533845 U 7/2010
(Continued)

OTHER PUBLICATIONS

Office action dated Aug. 2, 2017 for TW application No. 105141223, filing date: Dec. 13, 2016, p. 1 line 1-14, pp. 2-3 and p. 4 line 1-23.

*Primary Examiner* — Herbert K Roberts
(74) *Attorney, Agent, or Firm* — Winston Hsu

(57) ABSTRACT

A measuring device includes a first body, a second body slidably combined with the first body, a first pressure sensing component, and a control unit. The first body is for supporting a cup receiving liquid. The first pressure sensing component is disposed between the first body and the second body for sensing weight of the cup and the liquid and generating a signal corresponding to the weight. The control unit is electrically connected to the first pressure sensing component. The control unit determines a volume variation of the liquid according to a weight variation of the cup and the liquid calculated based on a difference between signals transmitted from the first pressure sensing component at different time points.

14 Claims, 8 Drawing Sheets

(51) Int. Cl.
*A47G 23/16* (2006.01)
*G01F 22/02* (2006.01)

(56) References Cited

U.S. PATENT DOCUMENTS

2016/0166096 A1* 6/2016 DiMaria-Ghalili .... G06Q 50/24
  702/19
2016/0256003 A1* 9/2016 Altenritter ............ A47J 43/046

FOREIGN PATENT DOCUMENTS

| | | |
|---|---|---|
| CN | 203493310 U | 3/2014 |
| CN | 104257232 A | 1/2015 |
| CN | 204120709 U | 1/2015 |
| CN | 205697037 U | 11/2016 |
| TW | M485674 U | 9/2014 |

\* cited by examiner

US 10,627,279 B2

MEASURING DEVICE FOR MEASURING A VOLUME VARIATION OF LIQUID

CROSS REFERENCE TO RELATED APPLICATIONS

This application claims the benefit of U.S. Provisional Patent Application No. 62/406,421 filed on Oct. 11, 2016, which is hereby incorporated by reference in its entirety.

BACKGROUND OF THE INVENTION

1. Field of the Invention

The present invention relates to a measuring device, and more particularly, to a measuring device for measuring a volume variation of liquid received in a cup.

2. Description of the Prior Art

With the rising healthcare awareness, more and more people put their emphasis on water intake. Drinking enough water plays an important role in boosting metabolism for maintaining a healthy body. However, people usually forget to drink water in their busy lives. Furthermore, since a regular cup has no function of providing drinking information of a user and reminding the user of drinking water, some people might get a specifically designed cup capable of reminding them of drinking water. However, people seldom use the designed cup because they forget to bring the designed cup or the designed cup does not fit into their drinking behavior, which fails to achieve an anticipated effect.

SUMMARY OF THE INVENTION

Therefore, it is an objective of the present invention to provide a measuring device for measuring a volume variation of liquid received in a cup for solving the aforementioned problem.

In order to achieve the aforementioned objective, the present invention discloses a measuring device includes a first body, at least one second body, at least one first pressure sensing component, and a control unit. The first body is for supporting a cup receiving the liquid. The at least one second body is slidably combined with the first body for being held. The at least one first pressure sensing component is disposed between the first body and the at least one second body for sensing weight of the cup and the liquid so as to generate a signal corresponding to the weight. The control unit is electrically connected to the at least one first pressure sensing component and for determining a volume variation of the liquid according to a weight variation of the cup and the liquid calculated based on a difference between signals transmitted from the at least one first pressure sensing component at different time points.

According to an embodiment of the present invention, the measuring device further includes at least one second pressure sensing component disposed on a side wall of the first body and electrically connected to the control unit. The at least one second pressure sensing component sensing the weight to generate a signal corresponding to the weight when the first body supports the cup at the folding status and a horizontal position, and the control unit further determines the volume variation of the liquid according to the weight variation of the cup and the liquid calculated based on a difference between signals transmitted from the at least one second pressure sensing component at different time points.

In summary, the measuring device of the present invention includes the first body and the second body capable of sliding up and down relative to each other. The first body supporting the cup is driven by the weight of the cup and the liquid to press the second body held by a user, so that the weight of the liquid can be determined according to a pressing force sensed by the pressure sensing component disposed on the second body. Furthermore, when the measuring device supports the cup with different positions, the measuring device can determine the volume variation of the liquid according to the weight variation of the cup and the liquid calculated based on signals transmitted from the first pressure sensing component or the second pressure sensing component at different time points. In such a way, the measuring device can be adapted to most cups available in the market and precisely record water intake in a cup sleeve mode or a cup coaster mode according to a user's drinking behavior, which can achieve a purpose of reminding the user of drinking enough water.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
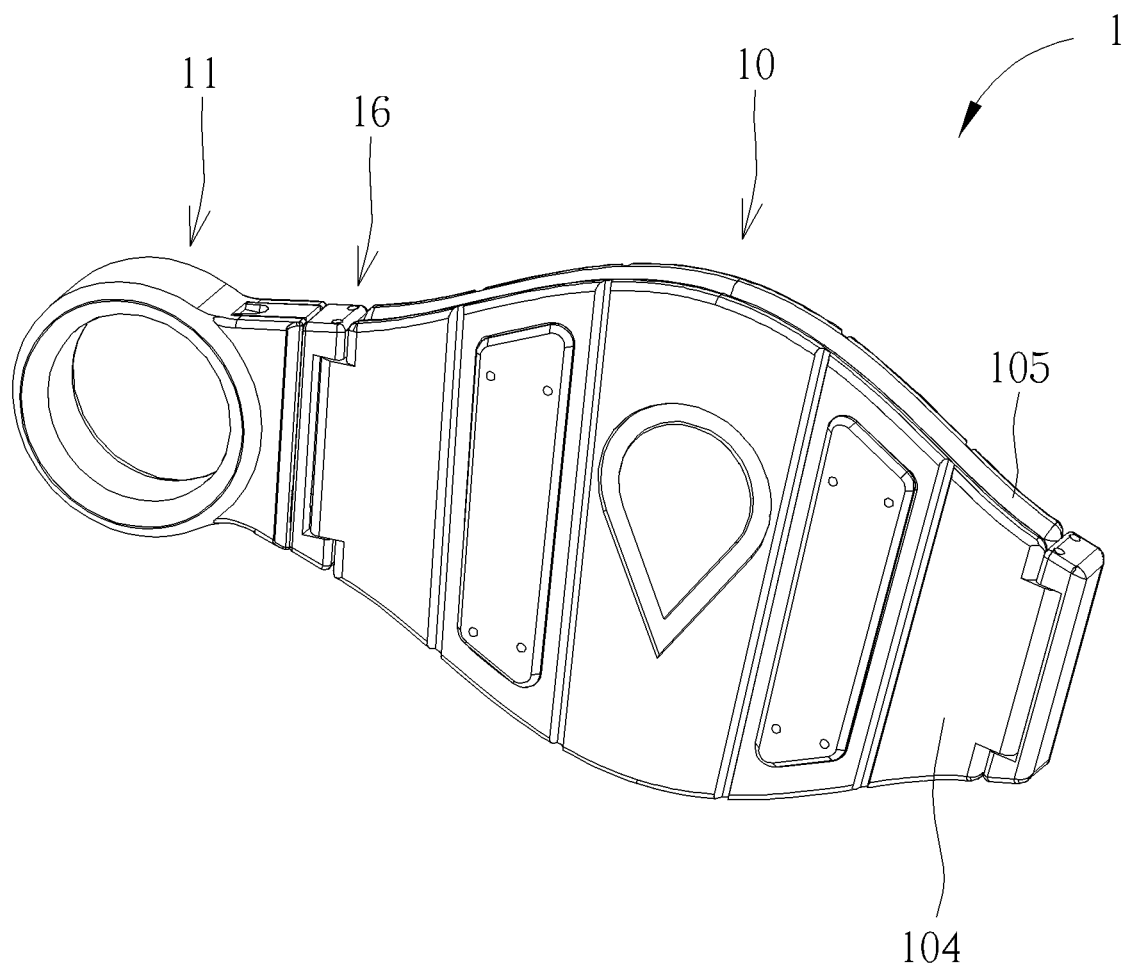
FIG. 1 is a schematic diagram of a measuring device according to a first embodiment of the present invention.
Figure 2:
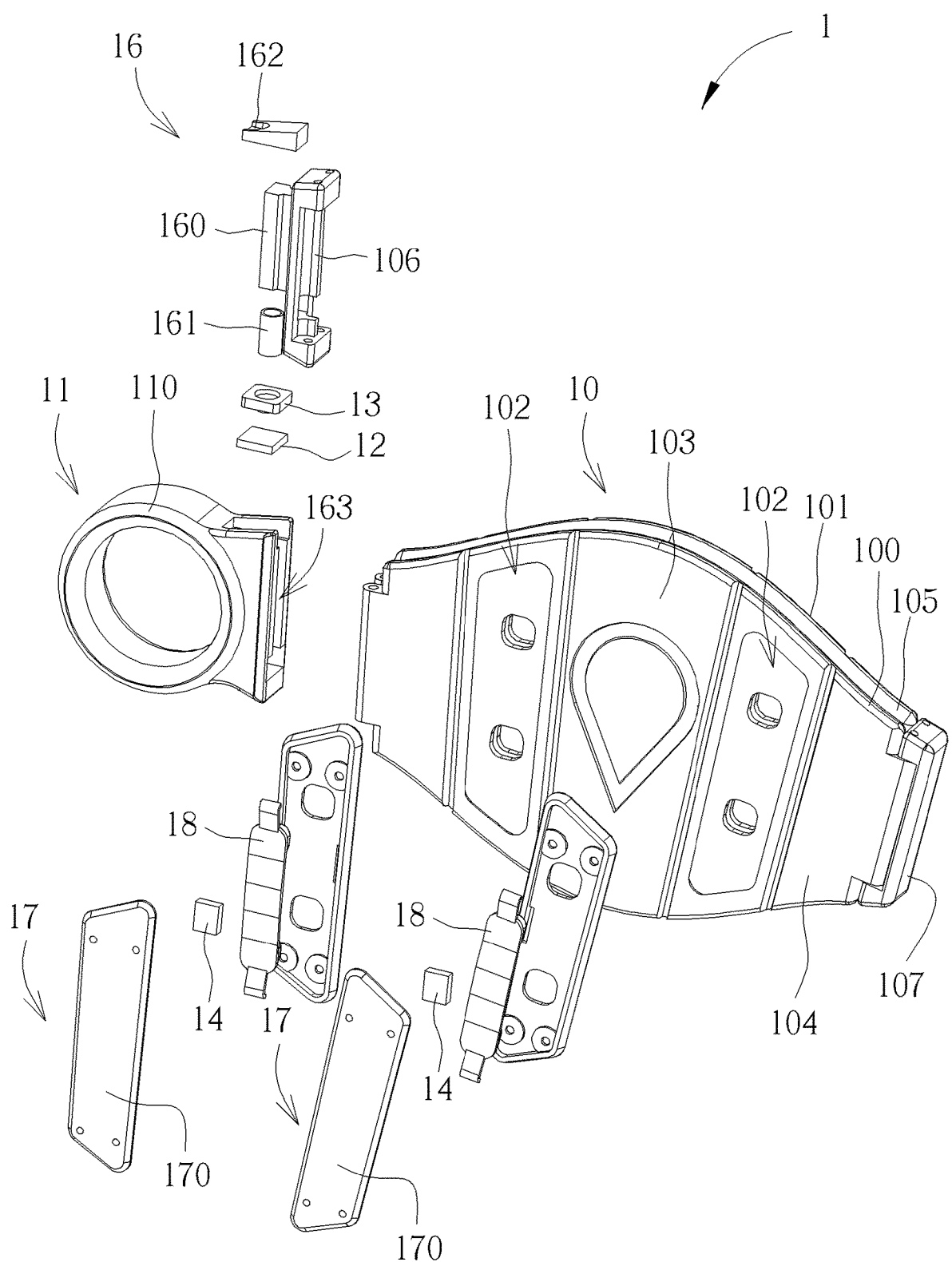
FIG. 2 is an exploded diagram of the measuring device according to the first embodiment of the present invention.
Figure 3:
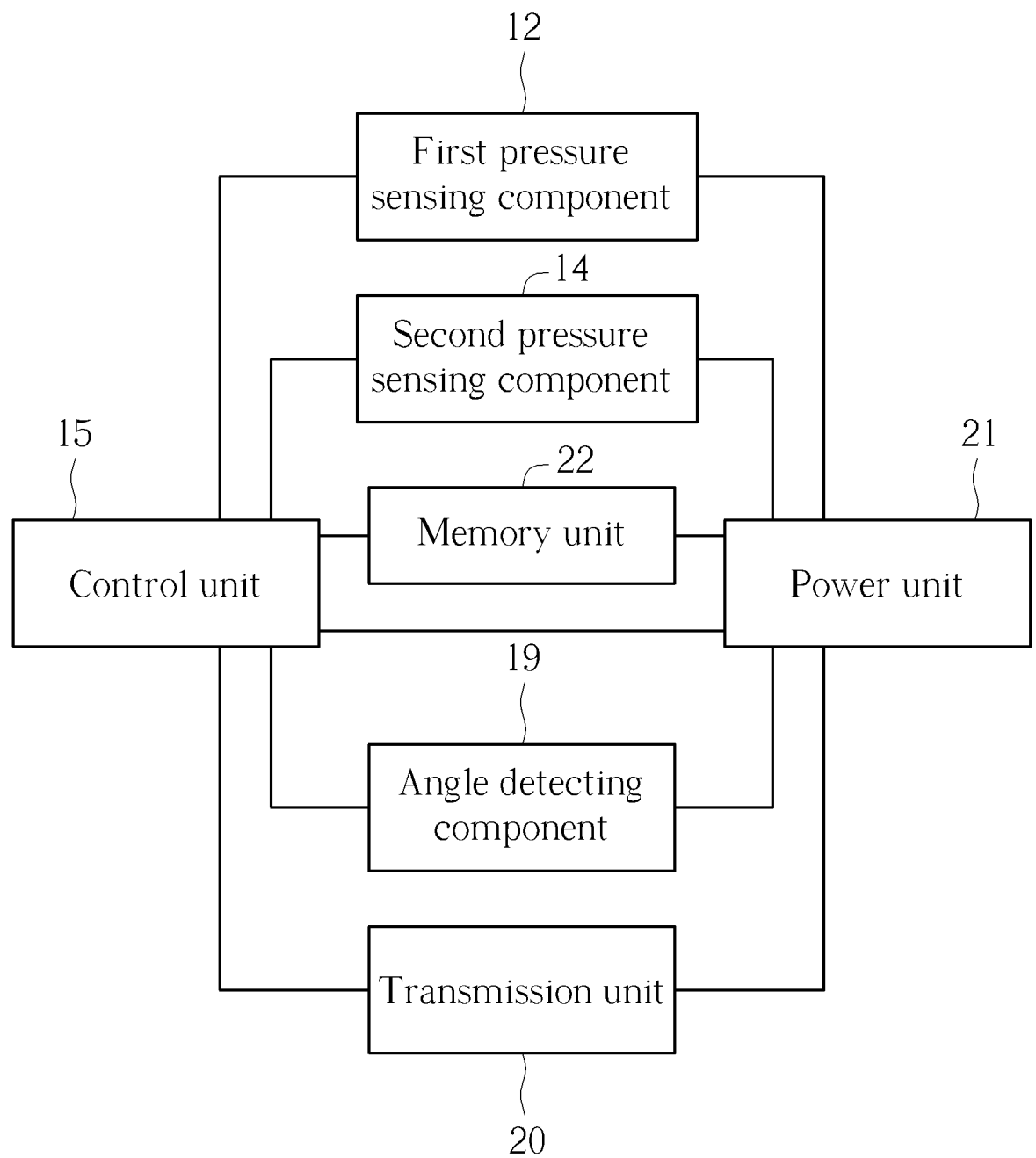
FIG. 3 is a functional block diagram of the measuring device according to the first embodiment of the present invention.
Figure 4:
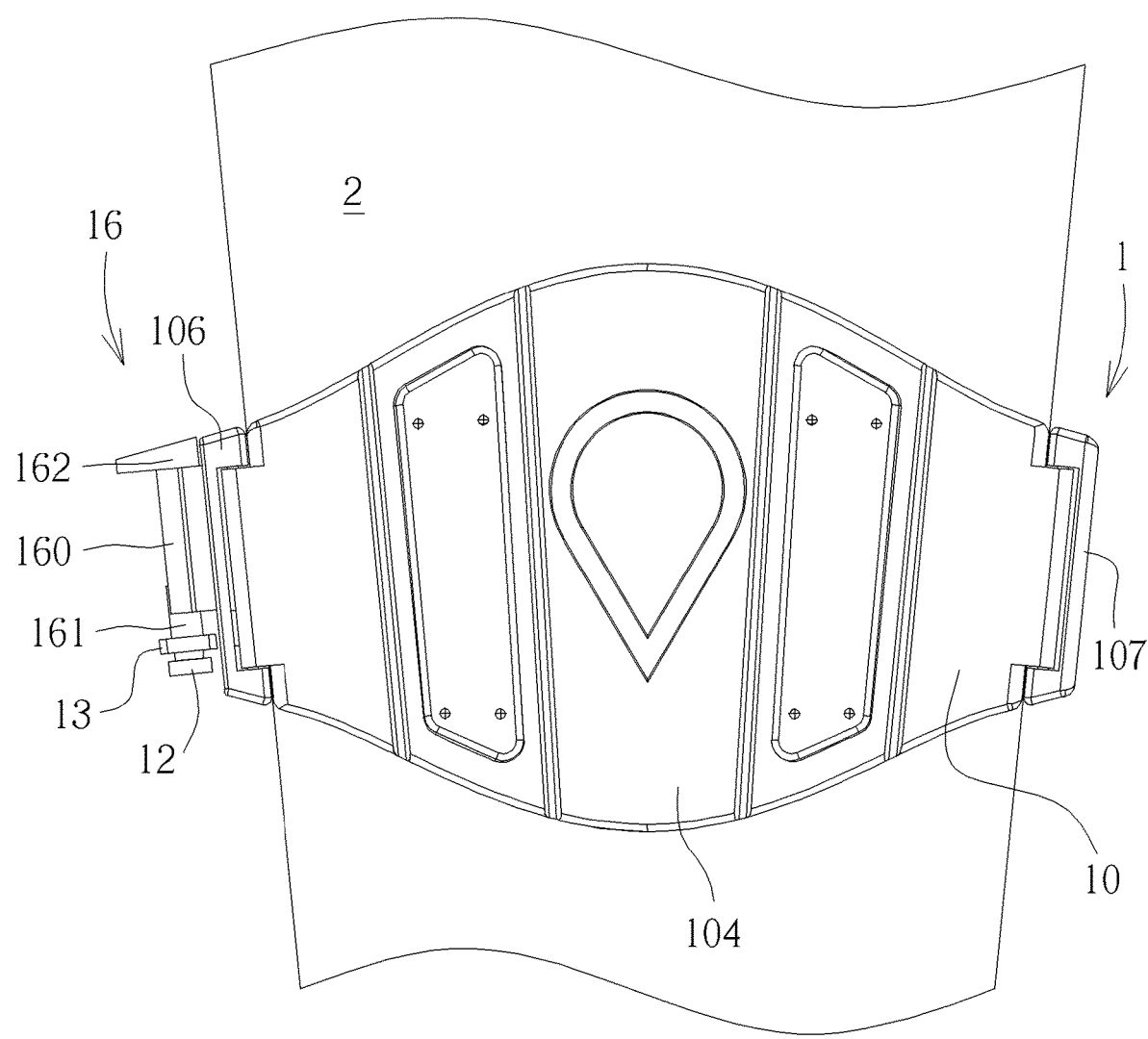
FIG. 4 is a diagram of the measuring device located at a non-horizontal position according to the first embodiment of the present invention.
Figure 5:
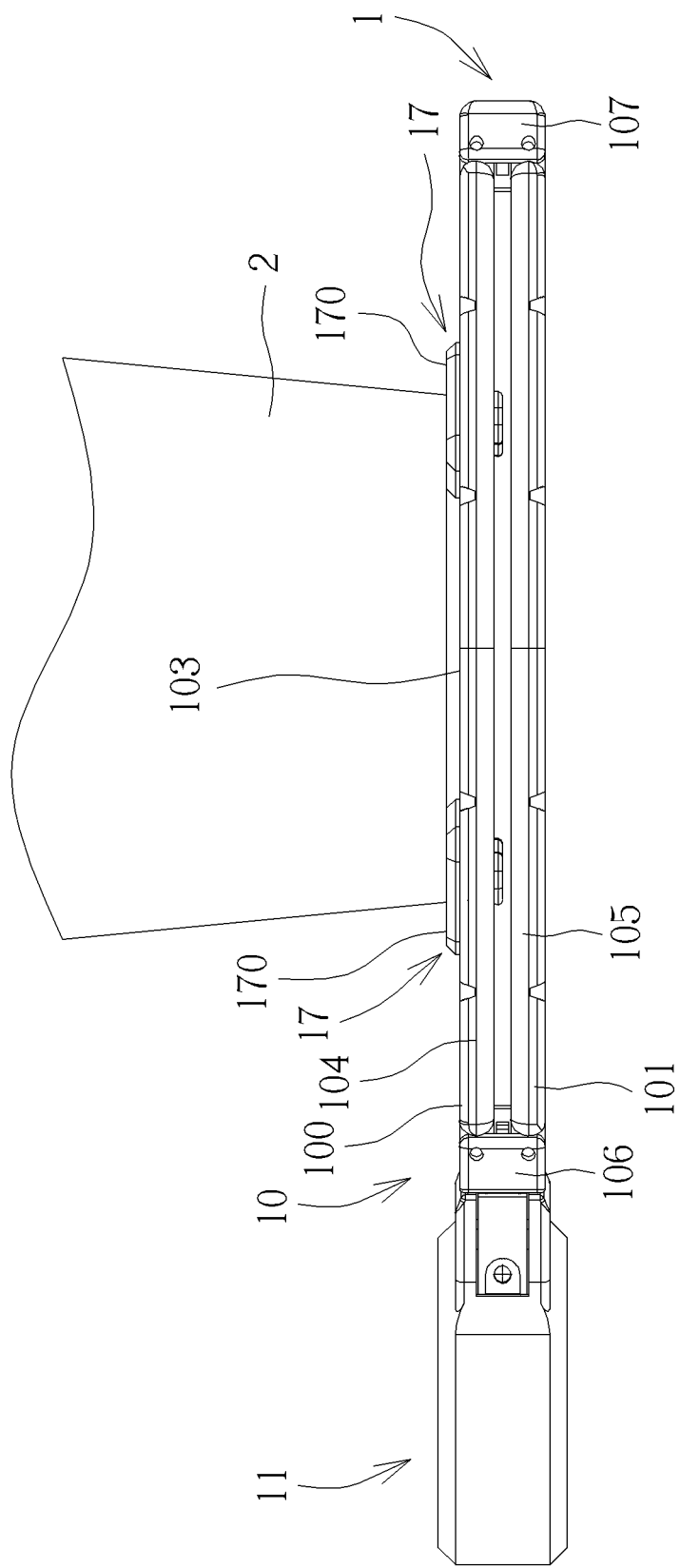
FIG. 5 is a diagram of the measuring device located at a horizontal position according to the first embodiment of the present invention.

Please refer to FIG. 1 to FIG. 5. FIG. 1 is a schematic diagram of a measuring device 1 according to a first embodiment of the present invention. FIG. 2 is an exploded diagram of the measuring device 1 according to the first embodiment of the present invention. FIG. 3 is a functional block diagram of the measuring device 1 according to the first embodiment of the present invention. FIG. 4 is a diagram of the measuring device 1 located at a non-horizontal position according to the first embodiment of the present invention. FIG. 5 is a diagram of the measuring device 1 located at a horizontal position according to the first embodiment of the present invention. As shown in FIG. 4 and FIG. 5, the measuring device 1 can measure a volume variation of liquid received in a cup 2 at the non-horizontal position or the horizontal position. As shown in FIG. 1 to FIG. 3, the measuring device 1 includes a first body 10, a second body 11, a first pressure sensing component 12, an abutting component 13, two second pressure sensing components 14, a control unit 15, and a power unit 21. In this embodiment, the first body 10 can be a foldable cup sleeve. The foldable cup sleeve can be formed by two plates 104, 105 which are made of resilient, flexible, or bendable material, and two ends of the plate 104 are connected to two ends of the plate 105 by two connecting components 106, 107. The second body 11 can be a handle disposed on the cup sleeve and slidable up and down relative to the foldable cup sleeve. As shown in FIG. 2, the second body 11 includes a holding portion 110 for a user to hold. The second body 11 is combined with the first body 10 in a slidable manner relative to the first body 10 along a direction. The first pressure sensing component 12 is disposed on the second body 11 and electrically connected to the control unit 15 disposed in the second body 11. The abutting component 13 is disposed at a position corresponding to the first pressure sensing component 12 for pressing the first pressure sensing component 12. The first pressure sensing component 12 generates a signal corresponding to a pressing force acting thereon, i.e., a pressing force of the abutting component 13. The two second pressure sensing components 14 are disposed on a side wall 100 of the plate 104 of the first body 10 and electrically connected to the control unit 15. The second pressure sensing component 14 generates a signal corresponding to a pressing force acting thereon. The power unit 21 is electrically connected to the control unit 15, the first pressure sensing component 12, and two second pressure sensing components 14. The control unit 15 controls the power unit 21 to provide electricity for the first pressure sensing component 12 and the two second pressure sensing components 14.

However, the numbers and the configurations of the first pressure sensing component 12 and the second pressure sensing component 14 are not limited to those illustrated in this embodiment. It depends on practical demands. For example, in another embodiment, the measuring device 1 can include only one second pressure sensing component 14 disposed the side wall 100 of the plate 104 of the first body 10. Alternatively, in another embodiment, the measuring device 1 can include four second pressure sensing components 14. Two of the four second pressure sensing components 14 are disposed on the side wall 100 of the plate 104 of the first body 10. The other two of the four second pressure sensing components 14 are disposed on a side wall 101 of the plate 105 of the first body 10. Furthermore, in this embodiment, the control unit 15 can be a microprocessor, a micro control unit (MCU), or a digital signal processor (DSP), and the power unit 21 can be a substrate with chargeable lithium-ion batteries. However, it is not limited thereto.

Moreover, the control unit 15 can be preferably configured to zero-calibrate the first pressure sensing component 12 and the two second pressure sensing components 14 when the measuring device 1 has not supported the cup 2 yet, which prevents sensing results of the first pressure sensing component 12 and the two second pressure sensing components 14 from being affected by weight of the measuring device 1.

The measuring device 1 further includes a sliding assembly 16. The sliding assembly 16 includes a sliding track 160, a recovering component 161, a restraining component 162, and a receiving portion 163. In this embodiment, the receiving portion 163 and the holding portion 110 of the second body 11 can be integrally formed. The sliding track 160 and the connecting component 106 can be integrally formed and slidably installed inside the receiving portion 163. The receiving portion 163 can be a sliding slot correspondingly. The first pressure sensing component 12 is fixed on a bottom portion of the receiving portion 163. The abutting component 13 is movably installed inside the receiving portion 163 and located between the sliding track 160 and the first pressure sensing component 12 for pressing the first pressure sensing component 12 when the sliding track 160 is forced to slide within the receiving portion 163 downwardly. The recovering component 161 is connected to the sliding track 160 and for pushing the sliding track 160 upwardly so as to drive the first body 10 to recover relative to the second body 11 when the sliding track 160 is released. The recovering component 161 can be a resilient component, such as a spring or a rubber. Besides, as shown in FIG. 2 and FIG. 4, in this embodiment, the recovering component 161 can be disposed on a bottom end of the sliding track 160. However, the configuration of the recovering component 161 is not limited to that illustrated in this embodiment. For example, in another embodiment, the recovering component 161 also can be disposed on a lateral side or a top end of the sliding track 160 as long as the recovering component 161 is capable of recovering the sliding track 160. The restraining component 162 is located at a top portion of the receiving portion 163 for restraining a sliding displacement of the sliding track 160, which prevents the first body 10 from unexpectedly separating from the second body 11 due to disengagement of the sliding track 160 and the receiving portion 163.

Furthermore, two accommodating slots 102 are formed on the side wall 100 of the plate 104 of the first body 10. The measuring device 1 further includes two protecting covers 17 and two platforms 18. The two platforms 18 are disposed inside the two accommodating slots 102 respectively. The two second pressure sensing components 14 are disposed on the two platforms 18 respectively and electrically connected to the control unit 15. The two platforms 18 support the two second pressure sensing components 14 for ensuring that the two second pressure sensing components 14 can be pressed correctly and evenly. The two protecting covers 17 cover the two accommodating slots 102 respectively, and surfaces 170 of the two protecting covers 17 protrude from a surface 103 of the side wall 100 of the plate 104 for supporting the cup 2, which ensures that weight of the cup 2 and the liquid can be sensed by the two second pressure sensing components 14 evenly and effectively. However, structure and sliding mechanism of the first body 10 and the second body 11 are not limited to those illustrated in figures of this embodiment. Furthermore, in another embodiment, the abutting component 13 can be omitted. The first pressure sensing component 12 can be pressed by the recovering component 161, the connecting component 106, or the bottom end of the sliding track 160 directly or indirectly.

Furthermore, as shown in FIG. 3, the measuring device 1 further includes an angle detecting component 19, a transmission unit 20, and a memory unit 22. The angle detecting component 19 is electrically connected to the control unit 15 and the power unit 21, so that the control unit 15 can determine the measuring device 1 is located at the horizontal position or the non-horizontal position according to a detecting result of the angle detecting component 19. For example, the angle detecting component 19 can include a G sensor or a gyroscope for detecting a disposing angle of the measuring device 1. When the control unit 15 determines the measuring device 1 is located at the non-horizontal position according to the detecting result of the angle detecting component 19, the control unit 15 controls the power unit 21 to provide electricity for the first pressure sensing component 12. The control unit 15 calculates the volume variation of the liquid according to the weight variation of the cup 2 and the liquid calculated based on a difference between signals transmitted from the first pressure sensing component 12 at different time points. On the other hand, when the control unit 15 determines the measuring device 1 is located at the horizontal position according to the detecting result of the angle detecting component 19, the control unit 15 controls the power unit 21 to provide electricity for the two second pressure sensing components 14. The control unit 15 calculates the volume variation of the liquid according to the weight variation of the cup 2 and the liquid calculated based on a difference between signals transmitted from the two second pressure sensing components 14 at different time points. In other words, as the measuring device 1 is located at different positions, the control unit 15 calculates the volume variation of the liquid according to the weight variation of the cup 2 and the liquid calculated based on a difference between signals transmitted from different pressure sensing components, i.e., the first pressure sensing component 12 or the second pressure sensing component 14, which achieves a purpose of correctly utilizing the first pressure sensing component 12 or the second pressure sensing component 14.

The memory unit 22 is electrically connected to the control unit 15 and the power unit 21 for storing the volume variation of the liquid determined based on the sensing result of the first pressure sensing component 12 or the two second pressure sensing components 14. The transmission unit 20 is electrically connected to the control unit 15 and the power unit 21 for transmitting the volume variation of the liquid to an external electronic device, such as a portable electronic device like a smart mobile phone. If the liquid is water, the portable electronic device can store the volume variation of the water as water intake record, which not only allows a user to review a history of the water intake during a specific period but also provides a reminding function for reminding the user of drinking water when the water intake is not enough. In this embodiment, the transmission unit 20 can be a Bluetooth transmitter or a universal serial bus (USB) connector. The memory unit 22 can be any type of memory. However, it is not limited thereto. Preferably, in this embodiment, the control unit 15, the power unit 21, the angle detecting component 19, the transmission unit 20, and the memory unit 22 can be installed inside the handle-shaped second body 11. The two second pressure sensing components 14 are electrically connected to the control unit 15 and the power unit 21 disposed inside the second body 11 by electrical wires and connectors.

Operational principle of the measuring device 1 of the present invention is described as follows. In order to illustrate the operational principle more specifically, the second body 11 is not shown in FIG. 4. In this embodiment, the first body 10 can be a foldable cup sleeve, and therefore the two plates 104, 105 of the first body 10 can be unfolded relative to each other to form an accommodating space for accommodating the cup 2. As shown in FIG. 4, the measuring device 1 supports the cup 2 receiving the liquid at the non-horizontal position, i.e., the measuring device 1 is in a cup sleeve mode. At this moment, the control unit 15 determines the measuring device 1 is located at the non-horizontal position according to the detecting result of the angle detecting component 19 and determines the volume variation of the liquid according to the weight variation of the cup 2 and the liquid calculated based on a difference between signals transmitted from the first pressure sensing component 12 at different time points. Specifically, when the first body 10 is sleeved on the cup 2 and the second body 11 is held by a user, the first body 10 is driven by the weight of the cup 2 and the liquid to slide downwardly relative to the second body 11 by the sliding track 160. Therefore, the abutting component 13 is driven to press the first pressure sensing component 12, so that the first pressure sensing component 12 generates a signal corresponding to the pressing force of the abutting component 13. Afterwards, the control unit 15 determines the volume variation of the liquid according to the weight variation of the cup 2 and the liquid calculated based on a difference between signals transmitted from the first pressure sensing component 12 at different time points.

Besides, when the two plates 104, 105 of the first body 10 are folded relative to each other for upwardly supporting the cup 2, as shown in FIG. 5, the measuring device 1 supports the cup 2 at the horizontal position, i.e., the measuring device 1 is in a cup coaster mode. At this moment, the control unit 15 determines the measuring device 1 is located at the horizontal position according to the detecting result of the angle detecting component 19 and determines the volume variation of the liquid according to the weight variation of the cup 2 and the liquid calculated based on a difference between signals transmitted from the two second pressures sensing components 14 at different time points. Since the surfaces 170 of the two protecting covers 17 protrude from the surface 103 of the side wall 100 of the plate 104 of the first body 10, the bottom portion of the cup 2 is supported by the two protecting covers 17 when the cup 2 is placed on the side wall 10 of the plate 104 of the first body 10. Therefore, the weight of the cup 2 and the liquid can press the two second pressure sensing components 14 evenly by the two protecting covers 17, so that the two second pressure sensing components 14 generate signals corresponding to the weight of the cup 2 and the liquid. Afterwards, the control unit 15 determines the volume variation of the liquid according to the weight variation of the cup 2 and the liquid calculated based on a difference between signals transmitted from the two second pressure sensing components 14 at different time points.

Figure 6:
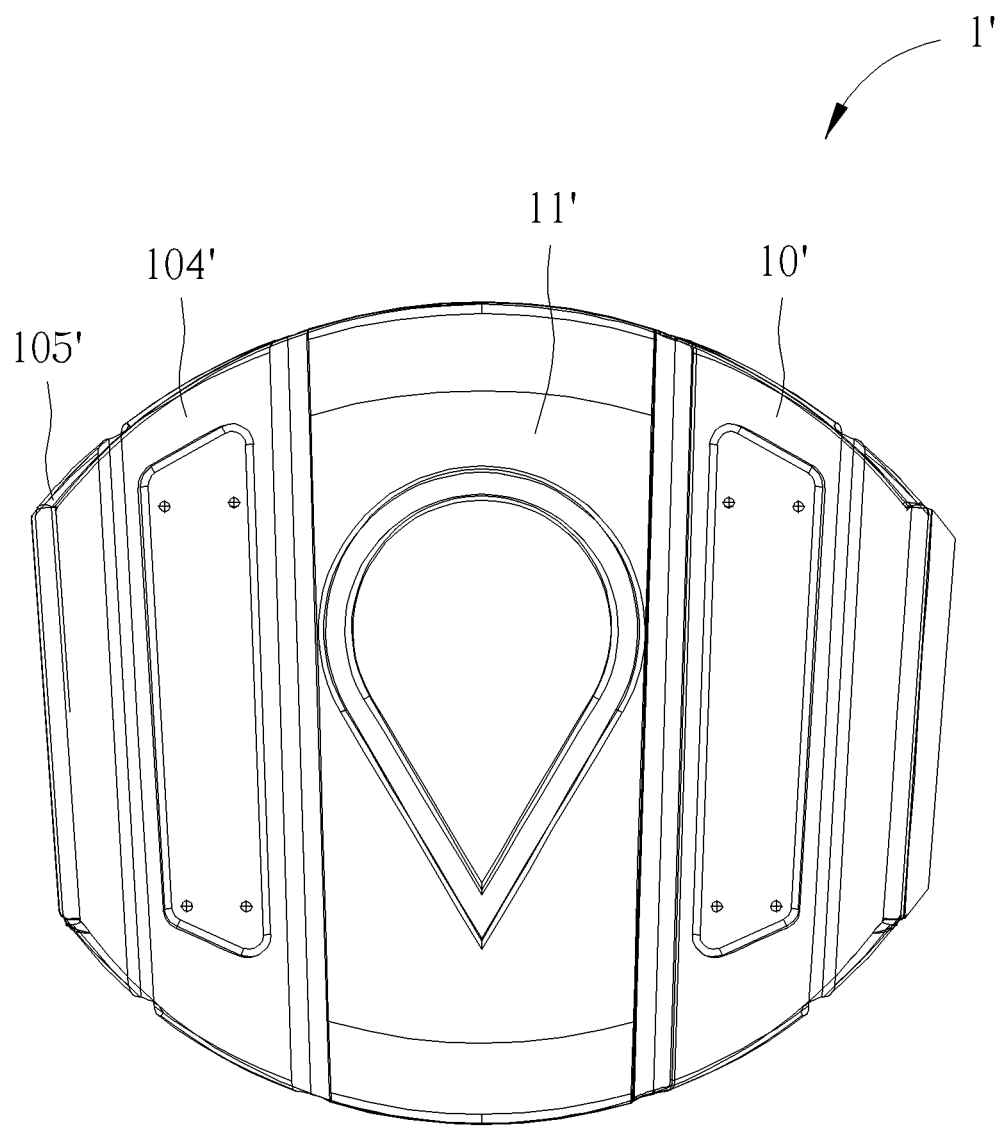
FIG. 6 is a schematic diagram of a measuring device according to a second embodiment of the present invention.
Figure 7:
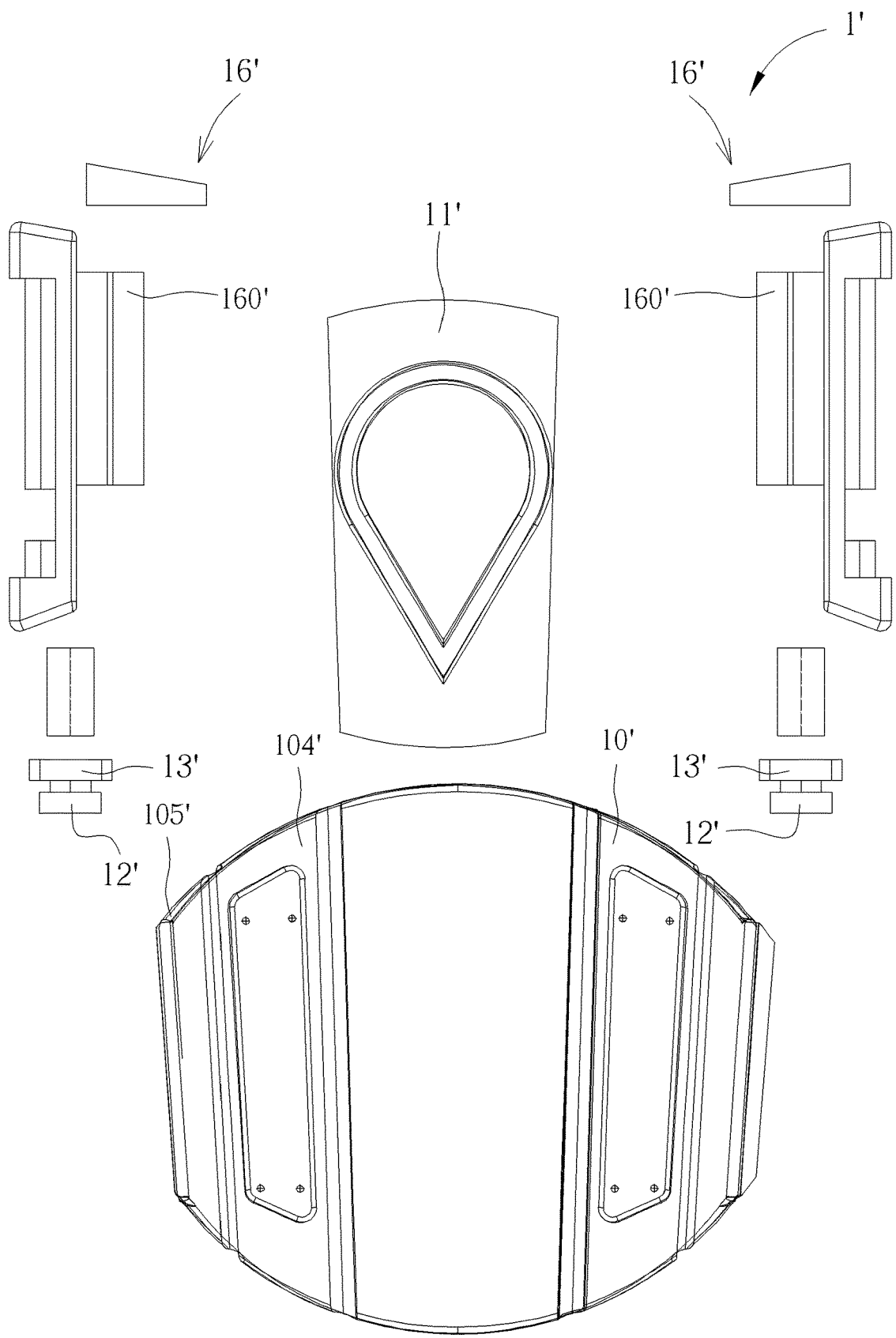
FIG. 7 is a partial diagram of the measuring device according to the second embodiment of the present invention.

Please refer to FIG. 6 and FIG. 7. FIG. 6 is a schematic diagram of a measuring device 1' according to a second embodiment of the present invention. FIG. 7 is a partial diagram of the measuring device 1' according to the second embodiment of the present invention. As shown in FIG. 6 and FIG. 7, different from the measuring device 1 of the first embodiment, the second body is formed in a plate shape and attached on the first body rather than a handle protruding from the first body. Specifically, the measuring device 1' includes two second bodies 11', four first pressure sensing components 12', four abutting components 13' and four sliding assemblies 16'. In this embodiment, the first body 10' can be a cup sleeve, and the two second body 11' can include two sliding plates slidably disposed on two side walls of two plates 104', 105' of the cup sleeve for a user to hold. Each of the four first pressure sensing components 12' is fixed on each side of the two second bodies 11'. Each of the four abutting components 13' is slidably installed on the corresponding second body 11' and located at a position corresponding to each of the four first pressure sensing components 12'. A sliding track 160' of each of the four sliding assemblies 16' is slidably connected to each side of the two second bodies 11' and fixed on the first body 10'. When the first body 10' is sleeved on the cup 2 and the two second bodies 11' are held by a user, the first body 10' is driven by the weight of the cup 2 and the liquid so as to slide downwardly relative to the two second bodies 11' by the four sliding tracks 160', so that each of the four abutting components 13' presses the corresponding first pressure sensing component 12'. Therefore, each of the four pressure sensing components 12' generates a signal corresponding to a pressing force of the corresponding abutting component 13'. In such a way, the control unit 15 determines the volume variation of the liquid according to the weight variation of the cup 2 and the liquid calculated based on a difference between signals transmitted from the four pressure sensing components 12' at different time points.

It should be noticed that, in the first embodiment and the second embodiment, the sliding track also can be fixed on the second body, and the first pressure sensing component can be disposed on the first body, so that the sliding track is capable of driving the abutting component to press the first pressure sensing component when the second body slides relative to the first body up and down. Operational principle thereof is the same as the aforementioned one. Therefore, the description is omitted herein for simplicity. Preferably, in this embodiment, the control unit 15, the power unit 21, the angle detecting component 19, the transmission unit 20, and the memory unit 22 are installed inside the first body 10', and the first pressure sensing component 12' can be electrically connected to the control unit 15 disposed inside the first body 10' by the electrical wire and the connectors.

Figure 8:
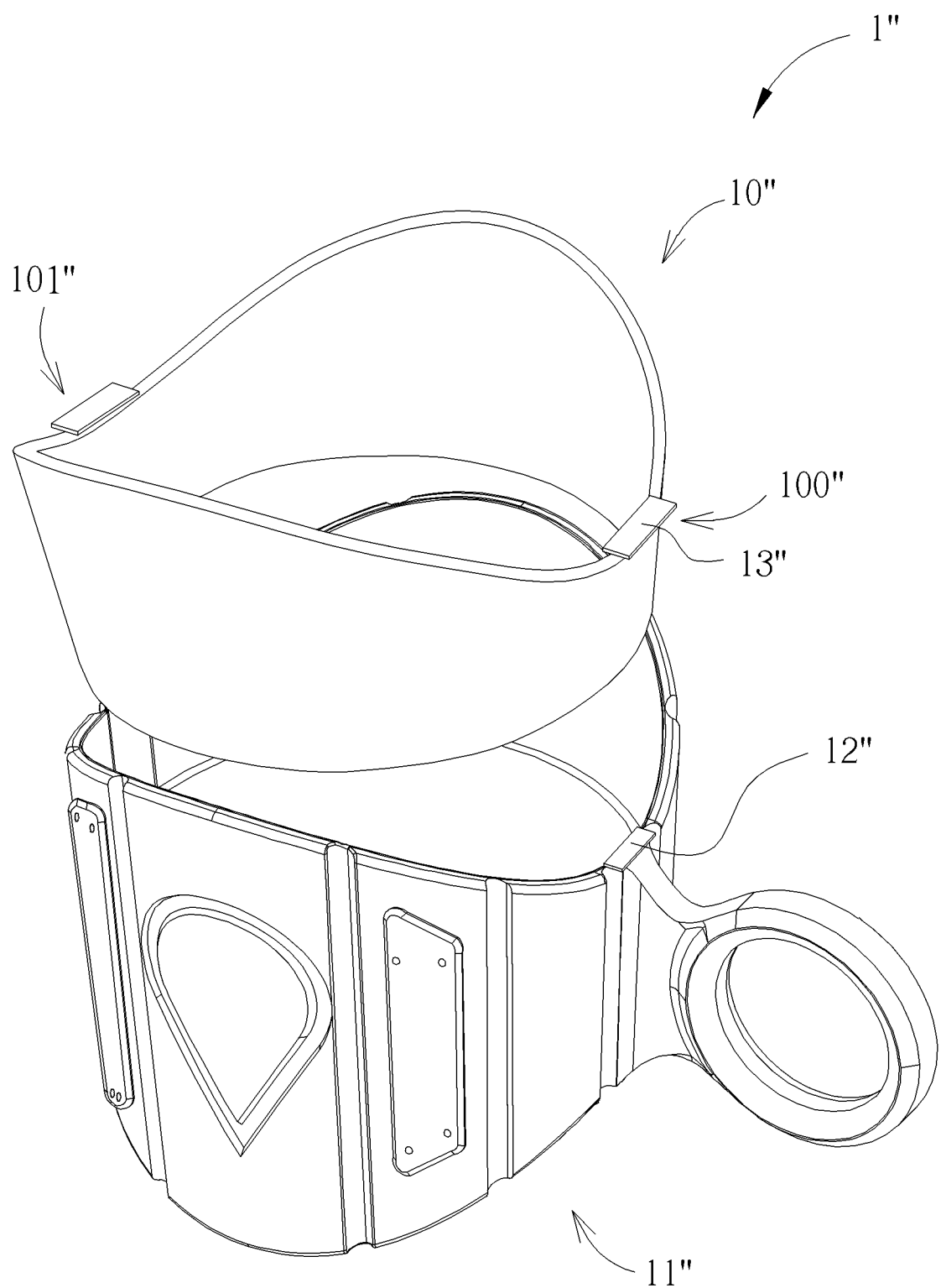
FIG. 8 is a partial exploded diagram of a measuring device according to a third embodiment of the present invention.

Please refer to FIG. 8. FIG. 8 is a partial exploded diagram of a measuring device 1" according to a third embodiment of the present invention. As shown in FIG. 8, different from the measuring devices 1, 1' of the aforementioned embodiments, the measuring device 1" includes a first body 10", a second body 11", a first pressure sensing component 12", and an abutting component 13". However, the sliding assembly of the aforementioned embodiment is omitted. In this embodiment, the first body 10" and the second body 11" can be respectively an inner cup sleeve and an outer cup sleeve sheathed with each other. In this embodiment, structure of the second body 11" is similar to structures of the first bodies 10, 10' of the aforementioned embodiments. The abutting component 13" protrudes from a side 100" of the first body 10", and the first pressure sensing component 12" is disposed on the second body 11" and located at a position corresponding to the abutting component 13". The other side 101" of the first body 10" is fixed on or abuts against the second body 11" without any pressure sensing component. However, it is not limited thereto. In another embodiment, the measuring device 1" can include two first pressure sensing components 12" disposed on the side 100" and the other side 101" of the first body 10". When the first body 10" is sleeved on the cup 2 and the second body 11" is held by a user, the first body 10" is driven by the weight of the cup 2 and the liquid to slide downwardly relative to the second body 11" by a fulcrum of the other side 101" of the first body 10", so that the abutting component 13" presses the first pressure sensing component 12". The first pressure sensing component 12" generates a signal corresponding to a pressing force of the abutting component 13". The control unit 15 determines the volume variation of the liquid according to the weight variation of the cup 2 and the liquid calculated based on a difference between signals transmitted from the first pressure sensing component 12" at different time points.

Furthermore, the first pressure sensing component 12" also can be disposed on the first body 10", and the abutting component 13" can be disposed on the second body 11" accordingly. The abutting component 13" presses the first pressure sensing component 12" when the second body 11" slides relative to the first body 10". Operational principle thereof is the same as the aforementioned one. Description is omitted herein for simplicity. Furthermore, similar to the measuring device 1 of the first embodiment, both of the measuring devices 1', 1" of the second embodiment and the third embodiment can be switched between the horizontal position and the non-horizontal position according to a user's drinking behavior. Preferably, in this embodiment, the control unit 15, the power unit 21, the angle detecting component 19, the transmission unit 20, the memory unit 22, the first pressure sensing component 12", and the second pressure sensing component 14 are disposed inside the second body 11".

In contrast to the prior art, the measuring device of the present invention includes the first body and the second body capable of sliding up and down relative to each other. The first body supporting the cup is driven by the weight of the cup and the liquid to press the second body held by a user, so that the weight of the liquid can be determined according to a pressing force sensed by the pressure sensing component disposed on the second body. Furthermore, when the measuring device supports the cup with different positions, the measuring device can determine the volume variation of the liquid according to the weight variation of the cup and the liquid calculated based on signals transmitted from the first pressure sensing component or the second pressure sensing component at different time points. In such a way, the measuring device can be adapted to most cups available in the market and precisely record water intake in the cup sleeve mode or the cup coaster mode according to a user's drinking behavior, which can achieve a purpose of reminding the user of drinking enough water.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A measuring device adapted for measuring a volume variation of liquid, the measuring device comprising:
   a first body being a cup sleeve having an accommodating space therein, the first body being configured to hold a lateral peripheral side of a cup receiving the liquid when the cup is accommodated in the accommodating space;

at least one second body slidably combined with the first body at a lateral position adjacent to the lateral peripheral side of the cup and having a holding portion configured to be held;

at least one first pressure sensing component disposed between the first body and the at least one second body to sense a pressing force of the first body applied on the at least one second body at the lateral position when the measuring device is lifted up to accordingly determine weight of the cup and the liquid so as to generate a signal corresponding to the weight; and a control unit electrically connected to the at least one first pressure sensing component and determining a volume variation of the liquid according to a weight variation of the cup and the liquid calculated based on a difference between signals transmitted from the at least one first pressure sensing component at different time points.

2. The measuring device of claim 1, wherein the at least one first pressure sensing component is disposed on one of the first body and the at least one second body, the measuring device further comprises at least one abutting component disposed on the other one of the first body and the at least one second body and located at a position corresponding to the at least one first pressure sensing component, and the at least one abutting component is forced to press the at least one first pressure sensing component when the weight acts on the at least one abutting component, so that the at least one first pressure sensing component generates the signal corresponding to the weight.

3. The measuring device of claim 2, wherein the at least one abutting component protrudes from the first body, and the at least one first pressure sensing component protrudes from the at least one second body.

4. The measuring device of claim 1, wherein the first body and the at least one second body are respectively an inner cup sleeve and an outer cup sleeve sheathed with each other.

5. The measuring device of claim 1, further comprising at least one sliding assembly, the sliding assembly comprising a sliding track and a receiving portion receiving the sliding track, the sliding track and the receiving portion being respectively disposed on one and the other one of the first body and the at least one second body, so as to allow the first body to slide relative to the at least one second body to press the at least one first pressure sensing component when the weight acts on the first body.

6. The measuring device of claim 5, wherein the at least one sliding assembly further comprises a recovering component connected to the sliding track to bias the first body to recover relative to the at least one second body.

7. The measuring device of claim 5, wherein the at least one sliding assembly further comprises a restraining component to restrain a sliding displacement of the sliding track.

8. The measuring device of claim 5, wherein the sliding track is fixed on the first body, the measuring device further comprises at least one abutting component, the at least one second body comprises a holding portion, the receiving portion is formed on the holding portion, the sliding track and the at least one abutting component are installed inside the receiving portion, and the at least one first pressure sensing component is fixed inside the receiving portion and located at a position corresponding to the at least one abutting component.

9. The measuring device of claim 1, wherein the cup sleeve is formed by two flexible or bendable plates, and two ends of one of the two flexible or bendable plates are connected to two ends of the other one of the two flexible or bendable plates, so that the first body is switched between a folding status or a unfolding status.

10. The measuring device of claim 9, further comprising at least one second pressure sensing component disposed on a side wall of the first body and electrically connected to the control unit, the at least one second pressure sensing component sensing the weight to generate a signal corresponding to the weight when the first body supports the cup at the folding status and a horizontal position, and the control unit further determining the volume variation of the liquid according to the weight variation of the cup and the liquid calculated based on a difference between signals transmitted from the at least one second pressure sensing component at different time points.

11. The measuring device of claim 10, further comprising at least one protecting cover and at least one platform, at least one accommodating slot being formed on the side wall of the first body, the at least one platform being disposed inside the at least one accommodating slot, the at least one second pressure sensing component being disposed on the at least one platform, the at least one protecting cover covering the at least one accommodating slot, and a surface of the at least one protecting cover protruding from a surface of the side wall of the first body, so as to support the cup.

12. The measuring device of claim 10, further comprising an angle detecting component electrically connected to the control unit, the control unit determining the measuring device is located at the horizontal position or a non-horizontal position according to a detecting result of the angle detecting component, the control unit determining the volume variation of the liquid according to the difference between the signals transmitted from the at least one second pressure sensing component at different time points when the control unit determines the measuring device is located at the horizontal position, and the control unit determining the volume variation of the liquid according to the difference between the signals transmitted from the at least one first pressure sensing component at different time points when the control unit determines the measuring device is located at the non-horizontal position.

13. The measuring device of claim 9, wherein the first body is made of resilient material.

14. The measuring device of claim 1, wherein the at least one second body comprises two sliding plates slidably disposed on two opposite side walls of the cup sleeve.

* * * * *